June 6, 1939.  R. L. NEGUS  2,161,721
METHOD OF AND APPARATUS FOR PURIFYING WATER
Filed Jan. 11, 1938
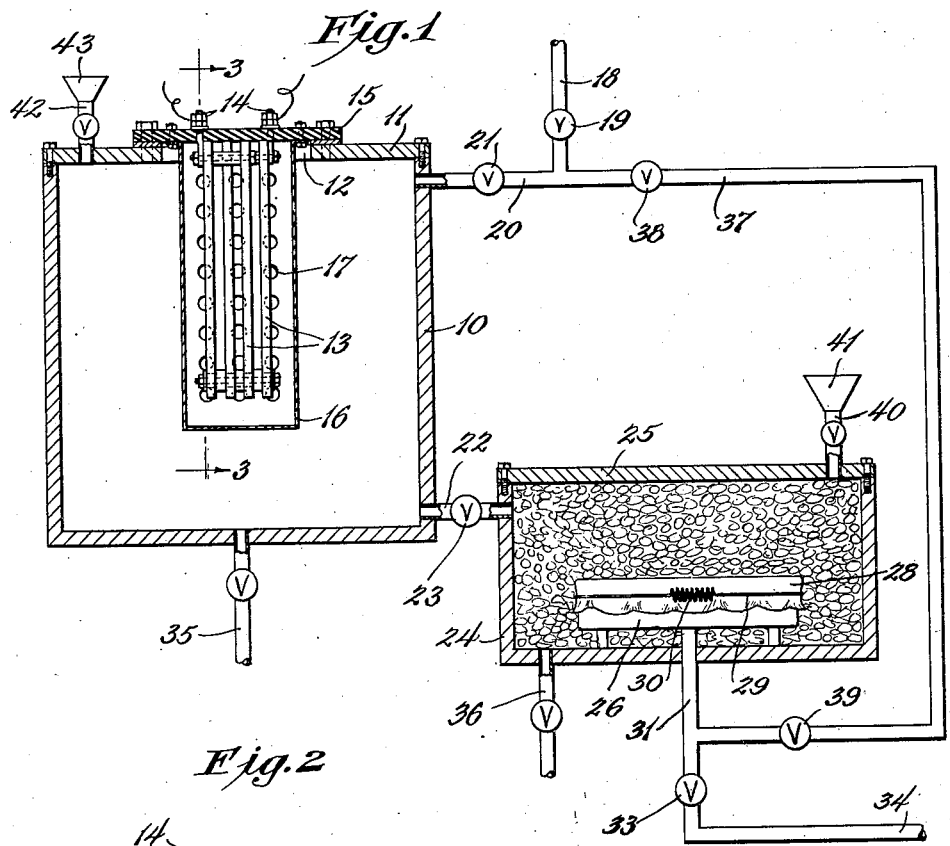
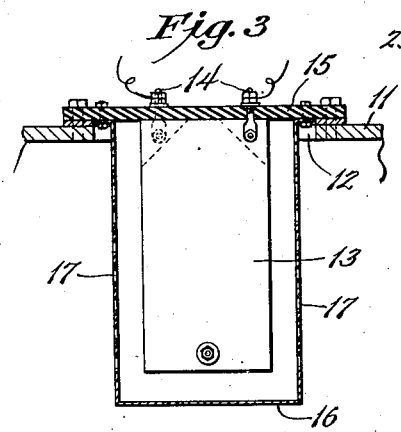
Inventor
R. L. Negus
By A. D. Adams
Attorney Patented June 6, 1939

2,161,721

UNITED STATES PATENT OFFICE 2,161,721

METHOD OF AND APPARATUS FOR PURIFYING WATER

Robert Lee Negus, Halifax, Nova Scotia, Canada, assignor, by direct and mesne assignments, to Aqua-Electric Corporation, Limited, Halifax, Nova Scotia, Canada, a body corporate Application January 11, 1938, Serial No. 184,462

2 Claims. (Cl. 210—132)

This invention relates to a method of and apparatus for purifying water and, among other objects, aims to provide a novel continuous process of treating water by precipitating some of the impurities and filtering the water so that it is ready for use. Also, the idea is to provide an improved method of cleaning slime or sludge from apparatus used in practicing the method. A still further aim is to provide novel apparatus for practicing the method and adapted to be used for the continuous treatment of water.

Other aims and advantages of the invention will appear in the specification, when considered in connection with the accompanying drawing, wherein:

Fig. 1 is a sectional view of one form of apparatus especially adapted to practice the method;

Fig. 2 is a top plan view of a series of electrodes shown in Fig. 1;

Fig. 3 is a fragmentary sectional view taken on the line 3—3 of Fig. 1; and

Fig. 4 is an enlarged sectional view of a filter element shown in Fig. 1.

Referring to the improved method, the invention involves the treatment of water by electrolysis conveniently by means of electrodes somewhat similar to those disclosed in United States Patent No. 2,079,950 to F. G. Negus, and thereafter conducting the water from the electrode container or tank to a filtering chamber where it is filtered through charcoal or other suitable filtering material and then passing it through a filtering cloth and fine filtering material; whence it passes to a point of use. This treatment is made continuous so that a supply of raw water requiring treatment may be fed continuously through the apparatus to a point of use. The supply of pure water to steam boilers is a good example.

Referring particularly to the drawing, one form of apparatus especially adapted to practice the method is disclosed in Fig. 1. In this instance, an electrical treatment chamber 10 in the form of a tank is shown as having a closed cover 11 with an opening 12 through which an electrode unit is introduced and secured to the top of the cover. The electrode unit in this instance, comprises a plurality of spaced electrode plates 13, alternate ones of which are electrically connected to the same terminal posts 14 being suitably held assembled by bolts and spacer washers some of which are made of insulating material so that one pair of electrodes is insulated from the other pair. The electrodes are suspended from a plate 15 of insulating material, which is conveniently bolted or otherwise removably secured to the top of the cover 11 in a watertight engagement therewith. The electrodes are shown as being arranged within a sheet metal electrode casing 16 secured at its upper end to the bottom of the plate 15, having openings 17 in its opposite sides to permit water to circulate through it and come in contact with the electrodes.

Water is introduced into the tank 10 through a supply pipe 18 having a control valve 19 and connected to a pipe 20 having another valve 21. It passes into the top portion of the tank and is conducted from the bottom portion of the tank through a pipe 22 having a control valve 23 into a filtering tank 24, also shown as having a removable watertight cover 25. The filtering chamber is preferably filled with charcoal or other suitable coarse filtering material and in the bottom of the casing there is arranged a final filtering device in the form of a metal receptacle or chamber 26 conveniently filled with fine filtering material, such as sand, "Zolite" or the like and having a removable metal perforated cover 27 over which is stretched a filter cloth 28 held in place by a hoop or band 29 having a spring 30 to grip the cloth against the wall. The filtered water passes through the filtering material in the pan 26 into an outlet pipe 31 covered by a screen 32 and having a control valve 33. It is then conducted through a water delivering main or pipe 34 to a point of use.

It is necessary at intervals to clean the filtering material and drain the sludge from both tanks by using city water and reversing the circulation through the tanks. For this purpose, the tanks have valved drain pipes 35 and 36. In this instance, the pipe 20 is shown as having a branch 37 which is connected to the pipe 31 leading from the filtering chamber 26. This branch is shown as being provided with valves 38 and 39. When it is desired to reverse the circulation through and cleanse the filtering media in the tank 24, the valves 21, 23 and 33 are closed, while the valves 38 and 39 are opened, so that city water is conducted through the pipes 37 and 31 into the filtering chamber 26 and, thence, through the filtering cloth into the tank 24 through the charcoal or the like and finally out the drain pipe 36 to a sewer.

It is desirable to introduce salt water or brine into the tank 24 to assist the water in cleansing the filter cloth and the charcoal. For this purpose, a valved pipe 40 having a funnel 41 is connected to the cover of the tank. Thus, practically all of the sludge on the cloth and in the filtering media will be washed out and pass through the drain 36.

To flush tank 10, water may be passed through it in either of two ways. Valves 19 and 21 and drain 35 may be opened and all other valves closed; then the water will flow directly into and through the tank 10. Also, valves 21, 31 and drain 36 may be closed and all other valves opened; then the water will flow in reverse through tank 24 and thence into the bottom of tank 10 and through a drain pipe 35 into the sewer. To assist in cleansing tank 10 salt brine may also be introduced into the tank through a valved pipe 42 having a funnel 43. Incidentally, the valves in pipes 40 and 42 may be opened to provide vents for the tanks when it is desired to drain them, the supply valve 18 being closed for this purpose. In this manner, loose sludge may be drained from both tanks without employing the flushing operation.

Obviously, the method is not dependent upon the particular apparatus herein shown and described. Neither is the invention limited to a strict conformity with the described steps employed in practicing the method.

What is claimed is:

1. Water treating apparatus of the class described comprising, in combination, a closed precipitation tank; a valved supply pipe connected to the tank; a valved sludge drain pipe connected to the bottom of the tank; a closed filtering container filled with a coarse filtering medium; a conduit connecting the lower portion of said tank to said container; a filtering chamber in the bottom of the container embedded in said filtering medium and having a perforated cover; a filter cloth stretched over said perforated cover; a valved delivery pipe connected to the bottom of said chamber; a valved sludge drain pipe connected to the bottom of said filtering container; valved conduits connected to the tank and the filtering container for introducing brine for cleansing purposes; and a valved branch pipe connecting the supply pipe to introduce backwashing water through said chamber, container and tank in series.

2. Water treating apparatus of the class described comprising, in combination, a closed precipitation tank; a valved supply pipe connected to the tank; a valved sludge drain pipe connected to the bottom of the tank; a closed filtering container filled with a coarse filtering medium communicating with said tank; a filtering chamber in said container embedded in said filtering medium and carrying a removable filter cloth; a valved delivery pipe connected to said chamber; a valved sludge drain pipe connected to the bottom of said filtering container; and a valved branch pipe connecting the supply pipe to the delivery pipe, whereby raw water may be introduced through the filtering chamber, container and tank for cleansing the filtering media and the collected sludge in said tank.

ROBERT LEE NEGUS.